(12) United States Patent
Suzuki et al.

(10) Patent No.: US 11,084,446 B2
(45) Date of Patent: Aug. 10, 2021

(54) COMPACTION MACHINE

(71) Applicant: Hitachi Construction Machinery Co., Ltd., Tokyo (JP)

(72) Inventors: Kazuya Suzuki, Higashine (JP); Masamichi Tanaka, Higashine (JP); Hiroshi Abe, Higashine (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 162 days.

(21) Appl. No.: 16/492,489

(22) PCT Filed: Jul. 19, 2018

(86) PCT No.: PCT/JP2018/027164
§ 371 (c)(1),
(2) Date: Sep. 9, 2019

(87) PCT Pub. No.: WO2019/054049
PCT Pub. Date: Mar. 21, 2019

(65) Prior Publication Data
US 2021/0138988 A1    May 13, 2021

(30) Foreign Application Priority Data

Sep. 15, 2017 (JP) .............................. JP2017-177748

(51) Int. Cl.
*B60R 21/13* (2006.01)
*B60Q 1/26* (2006.01)
(Continued)

(52) U.S. Cl.
CPC ............ *B60R 21/13* (2013.01); *B60Q 1/2615* (2013.01); *B60Q 1/50* (2013.01); *E01C 19/282* (2013.01); *E01C 2301/30* (2013.01)

(58) Field of Classification Search
CPC .......... B60Q 1/2615; B60Q 1/50; B60R 21/13
See application file for complete search history.

(56) References Cited

U.S. PATENT DOCUMENTS 9,266,490 B2 *  2/2016  Johnson .................. B60R 22/20
2004/0062608 A1  4/2004  Auf der Springe et al.
(Continued)

FOREIGN PATENT DOCUMENTS

EP    3 132 973 A1    2/2017
ER    2 377 729 A1    10/2011
(Continued)

OTHER PUBLICATIONS

International Search Report (PCT/ISA/210) issued in PCT Application No. PCT/JP2018/027164 dated Oct. 2, 2018 with English translation (two (2) pages).
(Continued)

*Primary Examiner* — Thomas M Sember
(74) *Attorney, Agent, or Firm* — Crowell & Moring LLP (57) ABSTRACT

A ROPS (protective structure) (15) is obtained by coupling upper ends of a pair of leg portions (15a) with a coupling portion (15b) and forming an arc-shaped curved portion (15c) between each of the leg portions (15a) and the coupling portion (15b), and is arranged so as to straddle vehicle bodies (4 and 5) and fixed. A working light (17) is fixed to the left curved portion (15c) via a mounting bracket (19), and a rotary light (18) is detachably mounted by fixing a mounting bracket (20). A protect region (E) formed into an approximately triangular shape is formed by the curved portion (15c) of the ROPS (15), a lateral restriction line (L1) in which a left-side surface corresponding to a maximum width of the vehicle bodies (4 and 5) is extended upward and an upper restriction line (L2) in which a maximum height of the ROPS (15) is extended laterally. The working light (17) and the mounting brackets (19 and 20) are arranged in the protect region (E), thereby preventing an outward protrusion.

6 Claims, 6 Drawing Sheets

(51) Int. Cl.
*E01C 19/28* (2006.01)
*B60Q 1/50* (2006.01)

(56) References Cited

U.S. PATENT DOCUMENTS

| | | | |
|---|---|---|---|
| 2011/0299916 A1 | 12/2011 | Baldus et al. | |
| 2015/0197208 A1* | 7/2015 | Johnson | B60R 21/13 |
| | | | 280/801.2 |

FOREIGN PATENT DOCUMENTS

| | | |
|---|---|---|
| JP | 57-23225 Y2 | 5/1982 |
| JP | 2008-240465 A | 10/2008 |
| JP | 2011-247058 A | 12/2011 |

OTHER PUBLICATIONS

Japanese-language Written Opinion (PCT/ISA/237) issued in PCT Application No. PCT/JP2018/027164 dated Oct. 2, 2018 (three (3) pages).

"Leaders in Compaction.", BOMAG, Sep. 4, 2017, pp. 1-24, Fayat Group, https://bsa.bomag.com/bsa/boo/pdf_files/PRE103335_1503.pdf#too lbar=1&statusbar=1&messages=0&pagemode=thumbs &view=Fit (24 pages).

Bomag Fayat Group, "Leaders in Compaction. Articulated Tandem Rollers, up to 11,000 lb.", Mar. 31, 2015, pp. 1-24, XP055797883, retrieved from the Internet: (URL:https://www.aaa.com.sa/brochures/construction_equipment/light/bomag/tandem-roulers.pdf) (retrieved on Apr. 21, 2021) (24 pages).

Hamm, "HD 14 VV Tandemwaize mit zwei Vibrationsbandagen", Oct. 31, 2016, pp. 1-2, XP055797939, Retrieved from the Internet: URL:http://www.altcon-mietpark.de/wp-content/uploads/2017/02/Hamm-HD-14-VV.pdf (retrieved on Apr. 22, 2021) (2 pages).

Supplementary European Search Report issued in European Application No. 18856743.2 dated May 11, 2021 (eight (8) pages).

\* cited by examiner

COMPACTION MACHINE

TECHNICAL FIELD

The present invention relates to a compaction machine, and more particularly to a compaction machine provided with a rollover protective structure (ROPS).

BACKGROUND ART

A rollover protective structure (hereinafter referred to as "ROPS") that prevents a driver's seat space from being crushed by weight of a vehicle is defined by an ISO standard (ISO 3471) assuming the case of rollover of a boarding-type compaction machine. In order to fulfill various conditions such as ensuring the driver's seat space in the event of rollover and not disturbing the operator's visibility at normal operations, the ROPS, for example, has a width nearly equal to a width of the vehicle and is manufactured to form a gate shape having a sufficient height, and is mounted at a rearmost portion of the compaction machine so as to straddle a vehicle body.

Meanwhile, the compaction machine is provided with various devices for assisting work (hereinafter collectively referred to as work assist devices by also including mounting brackets of the various devices). For example, such work assist devices include working lights illuminating the surroundings of a vehicle at night, rotating lights notifying nearby persons of the work in progress, and cameras imaging a rear side of a vehicle which is difficult for operators to visually recognize and displaying the image on a display at a driver's seat. Although these work assist devices have different purposes, it is desirable that they be installed as high as possible in order to perform their original functions.

Therefore, the ROPS may be used as a support member for work assist devices. For example, according to the compaction machines disclosed in Non-Patent Document 1 and Patent Documents 1 and 2, the work assist devices such as a rotating light are fixed to a gate-shaped ROPS.

PRIOR ART DOCUMENT

Patent Document

Patent Document 1: Unexamined Patent Application Publication No. 2011-247058
Patent Document 2: Japanese Examined Utility Model Application Publication No. S57-23225

Non-Patent Document

Non-Patent Document 1: Title: LEADERS IN COMPACTION, Related part: page 16, type of media: online, Publisher: BOMAG Gmbh, Search date: Sep. 4, 2017, Information source and address: Catalogue https://bsa.b-omag.com/bsa/boo/pdf_files/
PRE103335_1503.pdf#toolbar=1&statusbar=1&messages=0&pagemode=thumbs&view=Fit

SUMMARY OF THE INVENTION

Problems to be Solved by the Invention

However, in the compaction machine disclosed in Patent Document 1, no consideration is given to damage of the work assist devices.

That is, unlike other construction machines such as hydraulic shovels, compaction machines are often used in environments where sufficient space is not secured around the machines. For example, in the case where the compaction machine compacts a road surface along a wall or in the vicinity of a guard, compaction work is performed while making a vehicle body of the compaction machine as close as possible to the wall or the guard. As described above, since the ROPS is formed into a gate shape with the width nearly equal to the vehicle width in order to secure the driver's seat space in the event of rollover, not only the vehicle body but also the ROPS is very close to the wall and the guard.

In the compaction machine of Patent Document 1, since the ROPS is merely used as a support member for the work assist devices, the work assist devices may protrude laterally beyond a maximum width of the vehicle body and be fixed to the ROPS. In such a case, there arises a problem that the work assist devices are broken by contact with the wall or the guard.

Meanwhile, since this type of compaction machine is loaded on a trailer and so on and transported to a construction site, when the work assist devices protrude laterally beyond a maximum width of the vehicle body or when the work assist devices protrude above a maximum height of the ROPS, there is a possibility that they come in contact with an obstacle to cause damage during transportation. In particular, the ROPS is positioned at a considerable height due to loading on a trailer and so on. Meanwhile, a maximum height at the time of transportation is restricted by the regulations. For this reason, when the work assist devices protrude upward beyond a maximum height of the ROPS, it is also necessary to study a transportation method in consideration of height restrictions.

The present invention has been made to solve such problems, and the object is to provide a compaction machine capable of studying a transportation method to accommodate height restrictions without considering work assist devices while preventing damage to the work assist devices caused by contact with an obstacle in advance even when the work assist devices are fixed using a ROPS as a support member.

Means for Solving the Problems

In order to achieve the above object, a compaction machine of the present invention includes: a protective structure formed into a gate shape obtained by coupling upper ends of a pair of leg portions with a coupling portion and in which an arc-shaped curved portion is formed between each of the leg portions and the coupling portion, the protective structure arranged so as to straddle a vehicle body and in which a lower portion of each of the leg portions is fixed to the vehicle body; and a work assist device arranged within a protect region formed into an approximately triangular shape surrounded by at least either one of the curved portions, a lateral restriction line in which a side surface corresponding to a maximum width of the vehicle body is extended upward and an upper restriction line in which a maximum height of the protective structure is extended laterally, and fixed to the curved portion of the protective structure in a state that the work assist device is prevented from protruding from within the protect region.

Advantageous Effects of the Invention

According to the compaction machine of the present invention, even when work assist devices are fixed using a ROPS as a support member, it is possible to study a transportation method to accommodate height restrictions without considering the work assist devices, and to prevent damage to the work assist devices caused by contact with an obstacle in advance.

MODE FOR CARRYING OUT THE INVENTION

An embodiment in which the present invention is applied to a vibration roller will be described.

Figure 1:
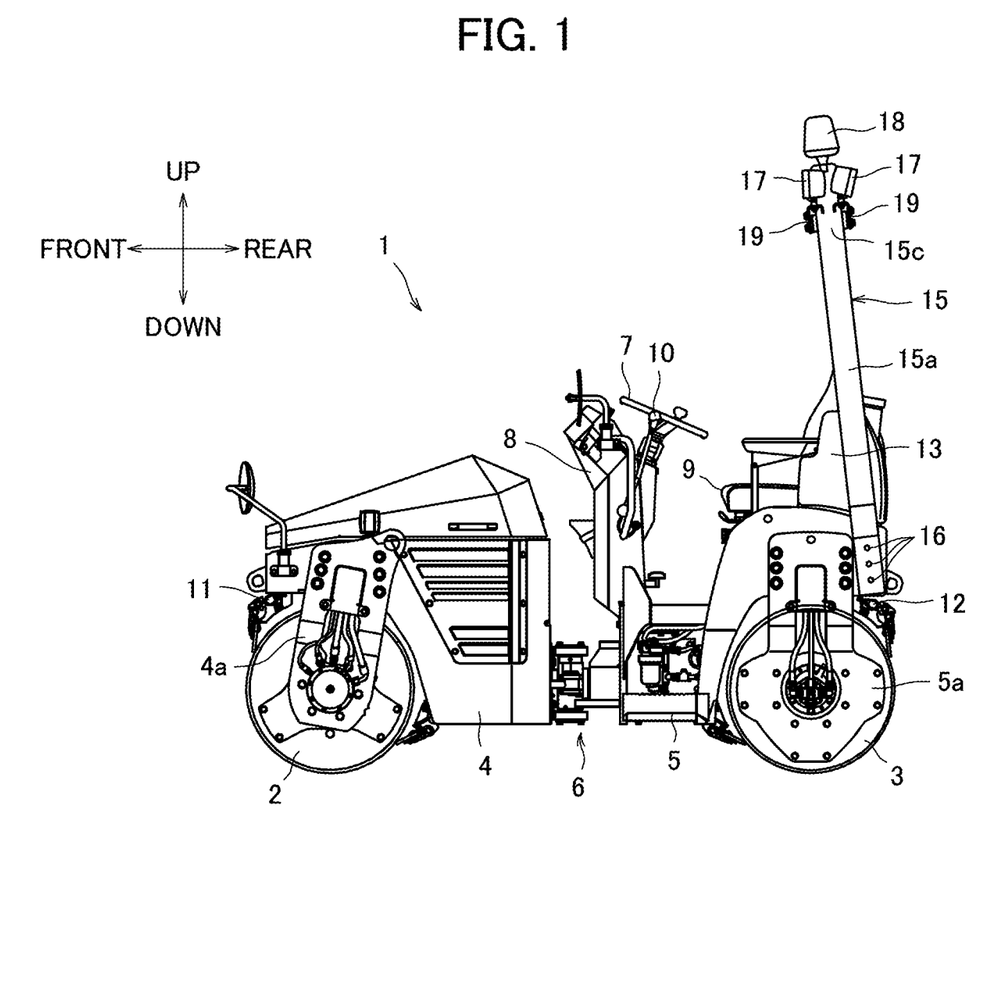
FIG. 1 is a side view showing a vibration roller of a first embodiment.
Figure 2:
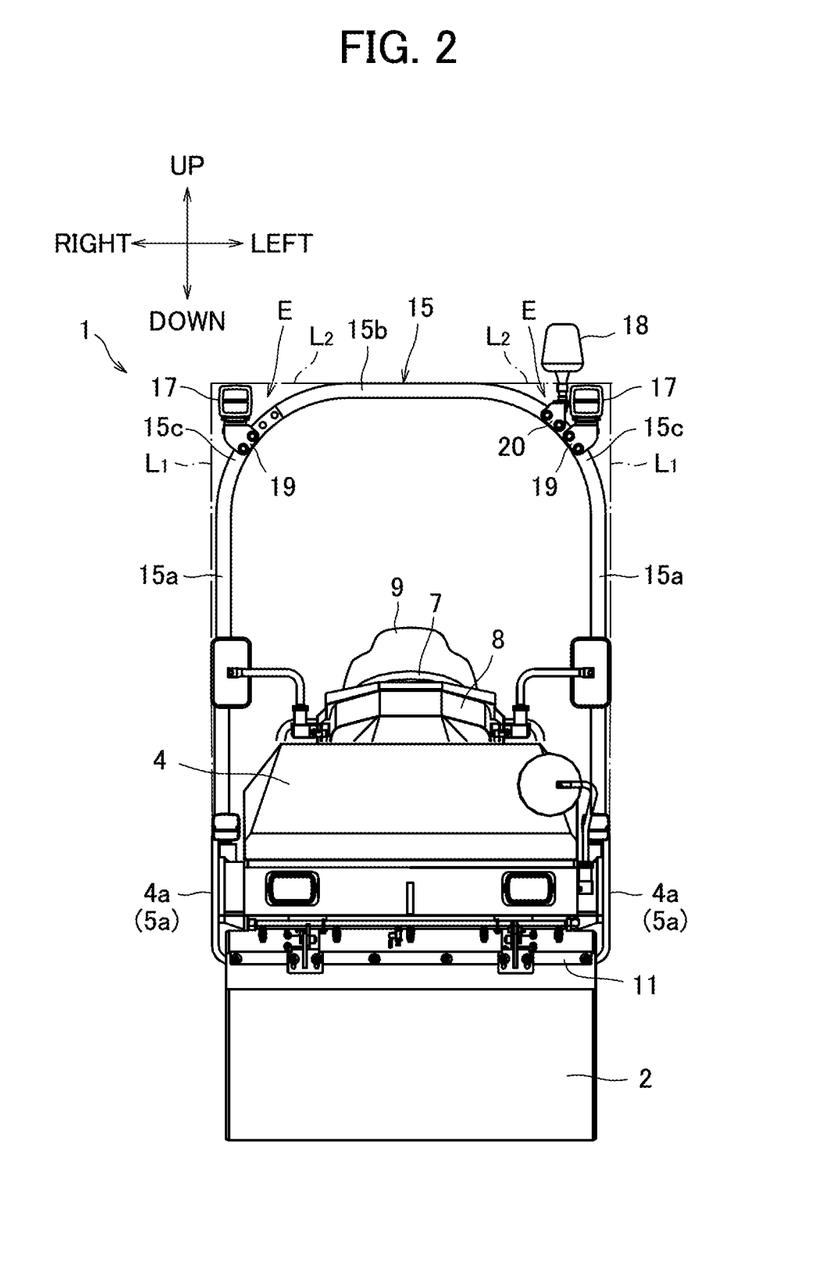
FIG. 2 is a front view showing the vibration roller.

FIG. 1 is a side view showing a vibration roller of the present embodiment and FIG. 2 is a front view showing a vibration roller of the same. Hereinafter, front and rear, left and right, up and down directions are defined mainly by an operator who boards a vibration roller.

A vibration roller 1 of the present embodiment is a tandem type in which a front compaction wheel 2 and a rear compaction wheel 3 are formed of metal drums having a length nearly equal to a vehicle width. A vehicle body of the vibration roller 1 includes a front vehicle body 4 and a rear vehicle body 5, in which the front compaction wheel 2 is rotatably supported via arms 4a provided on the left and right sides of the front vehicle body 4 and the rear compaction wheel 3 is rotatably supported via arms 5a provided on the left and right sides of the rear vehicle body 5. The front vehicle body 4 and the rear vehicle body 5 are coupled via an articulate mechanism 6 that can be bent in a horizontal direction centering on a center pin, in which the vehicle is made to turn by bending mutually.

An operation platform 8 provided with a steering 7 is installed at a front position on the rear vehicle body 5, and a bench-type driver seat 9 is installed behind the operation platform 8. An operator sitting on the driver's seat 9 operates the steering 7 and forward-reverse levers 10 provided on both sides of the operation platform 8, whereby the vibration roller 1 travels using Hydro Static Transmission (HST), which is driven by an engine (not shown) mounted on the front vehicle body 4 according to the operation, as a drive source.

A front sprinkler nozzle 11 is arranged on the front compaction wheel 2, a rear sprinkler nozzle 12 is arranged on the rear compaction wheel 3, and these sprinkler nozzles 11 and 12 are connected to a water spray tank 13 arranged on the rear vehicle body 5. In performing compaction work, the water stored in a water sprinkler tank 13 is sprinkled from the water sprinkler nozzles 11 and 12 to an outer peripheral surface of the compaction wheels 2 and 3 in order to prevent adhesion of pavement materials to the compaction wheels 2 and 3.

At the rearmost portion of the rear vehicle body 5 of the vibration roller 1, that is to say, at the position immediately after the driver's seat 9, a rollover protective structure (ROPS) 15 is installed. As is well known, the ROPS 15 is a safety gear that prevents the driver's seat space from being crushed by weight of the vehicle in the event of rollover of a boarding-type compaction machine. For this reason, the ROPS 15 is manufactured by curving a pipe made of aluminum or iron, and formed into a gate shape having sufficient strength. Hereinafter, for the sake of convenience of explanation, the regions on the left and right sides of the ROPS 15 will be referred to as leg portions 15a, and the upper side region coupling the upper ends of the respective leg portions 15a will be referred to as a coupling portion 15b.

The ROPS 15 is required to fulfill various conditions such as ensuring the driver's seat space in the event of rollover and not disturbing the operator's visibility at normal operations. In order to fulfill these requirements, the ROPS 15 has a width (distance between the leg portions 15a) that is set to be nearly equal to the vehicle width and is arranged so as to straddle the rear vehicle body 5, and a lower portion of each of the leg portions 15a is fixed to the left and right sides of the rear vehicle body 5 with bolts 16. Therefore, an operator can visually recognize the rear of the vibration roller 1 without being disturbed by the left and right leg portions 15a during normal work, and a maximum driver's seat space is secured in the vehicle width direction in the event of rollover.

Further, a height of the ROPS 15 (height of the coupling portion 15b) is set sufficiently higher than a head of an operator seated in the driver's seat 9, and the entire ROPS 15 is slightly inclined forward from upright position such that the coupling portion 15b approaches the head of the operator in a front-rear direction. As a result, a sufficient driver's seat space is secured in the up and down direction in the event of rollover.

The ROPS 15 configured in this way is also used as a support member for work assist devices. In the present embodiment, four working lights 17 for illuminating the front and rear of the vibration roller 1 and one rotating light 18 for notifying nearby persons of the work in progress are fixed to the ROPS 15.

As described in [Problems to be solved by the invention], in the compaction machine of Patent Document 1 in which the work assist devices are fixed to the ROPS 15 as in the present embodiment, there arises a problem that the work assist devices that protrude laterally beyond a maximum width of the vehicle body come in contact with a wall or a guard to cause the damage during compaction work, or the work assist devices that protrude above a maximum height of the ROPS come in contact with an obstacle to cause damage during transportation by trailer and so on.

In view of such problems, the inventors have studied the restrictions on the installation positions of the work assist devices.

When the vibration roller 1 compacts a road surface along a wall or in the vicinity of a guard, there arises a problem with a lateral protrusion, but as long as the work assist devices fall within a maximum width of the vehicle bodies 4 and 5, in most cases it is possible to avoid contacting with an obstacle. In addition, upon transportation by trailer and so on, there arises with an upward protrusion, but as long as the work assist devices fall within a maximum height of the ROPS 15, in most cases it is possible to avoid contacting with an obstacle. Meanwhile, in order for the work assist devices to perform their original functions, they are required to be installed as high as possible.

In order to fulfill the above requirements, the inventors have focused on approximately triangular regions formed on the left and right shoulders of the ROPS 15.

That is, the left and right leg portions 15*a* of the ROPS 15 and the coupling portion 15*b* are connected via arc-shaped regions (hereinafter referred to as curved portions 15*c*). By gently changing a shape of the ROPS 15 via the curved portions 15*c*, the present invention is intended to prevent stress concentration when receiving weight of the vehicle in the event of rollover, and thus prevent deformation of the ROPS 15.

Such curved portions 15*c* of the ROPS 15 are ready-made. As shown in FIG. 2, each of the approximately triangular regions (hereinafter referred to as a protect region E) is formed between the curved portion 15*c*, an imaginary line in which the side surface corresponding to a maximum width of the vehicle bodies 4 and 5 is extended upward (hereinafter, referred to as a lateral restriction line L1) and an imaginary line in which the maximum height of the ROPS 15 is extended laterally (hereinafter referred to as an upper restriction line L2). In order for the work assist devices to fall within each of the protect regions E, the work assist devices are arranged in the protect regions E after a curvature of the respective curved portions 15*c* is set according to the sizes and the number of the work assist devices. It is therefore possible to prevent contact with an obstacle in both cases of compaction work and transportation.

A fixing structure of the work assist devices for the ROPS 15 based on the above knowledge will be described below as the first to third embodiments.

Here, since the rotating light 18 is obliged to be removed at the time of transportation of the vibration roller 1 according to the regulations, only a mounting bracket 20 for fixing the rotating light 18 remains in the ROPS 15 at the time of transportation. For this reason, it is not necessary to put the rotating light 18 itself in the protect region E, and it is considered that only the mounting bracket 20 falls within the protect region E.

First Embodiment

As shown in FIGS. 1 and 2, in the present embodiment, a pair of front and rear working lights 17 (device main body) and a rotating light 18 (device main body) are arranged in the protect region E of the left shoulder of the ROPS 15, and a pair of front and rear working lights 17 (device main body) is arranged in the protect region E of the right shoulder of the same. Since a fixing structure of the working lights 17 is the same in the left and right sides, the fixing structure of the working lights 17 and the rotating light 18 in the protect region E of the left shoulder will be described.

Figure 3:
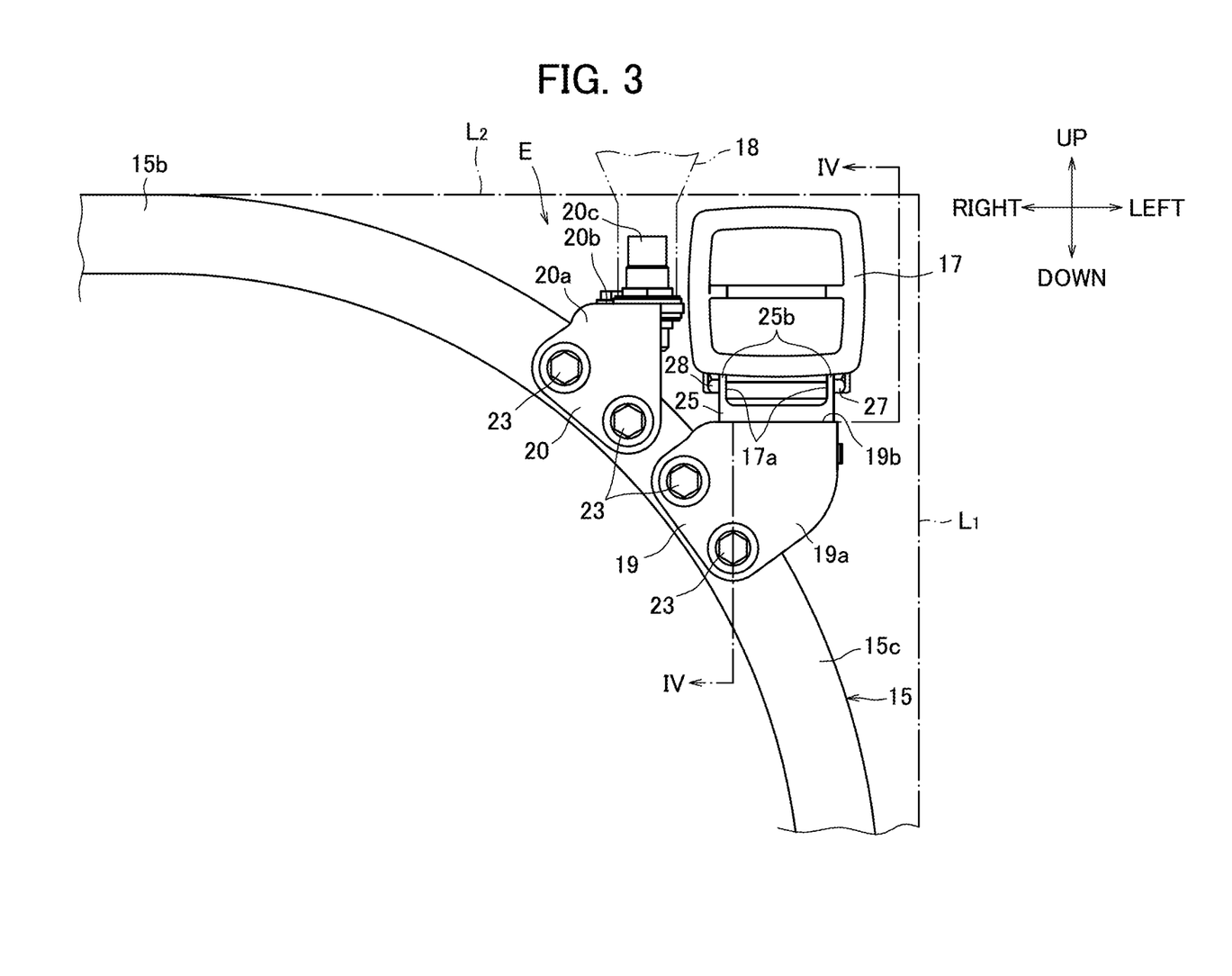
FIG. 3 is a detailed view showing a fixing structure of a working light and a rotating light in a protect region of a left shoulder of ROPS.
Figure 4:
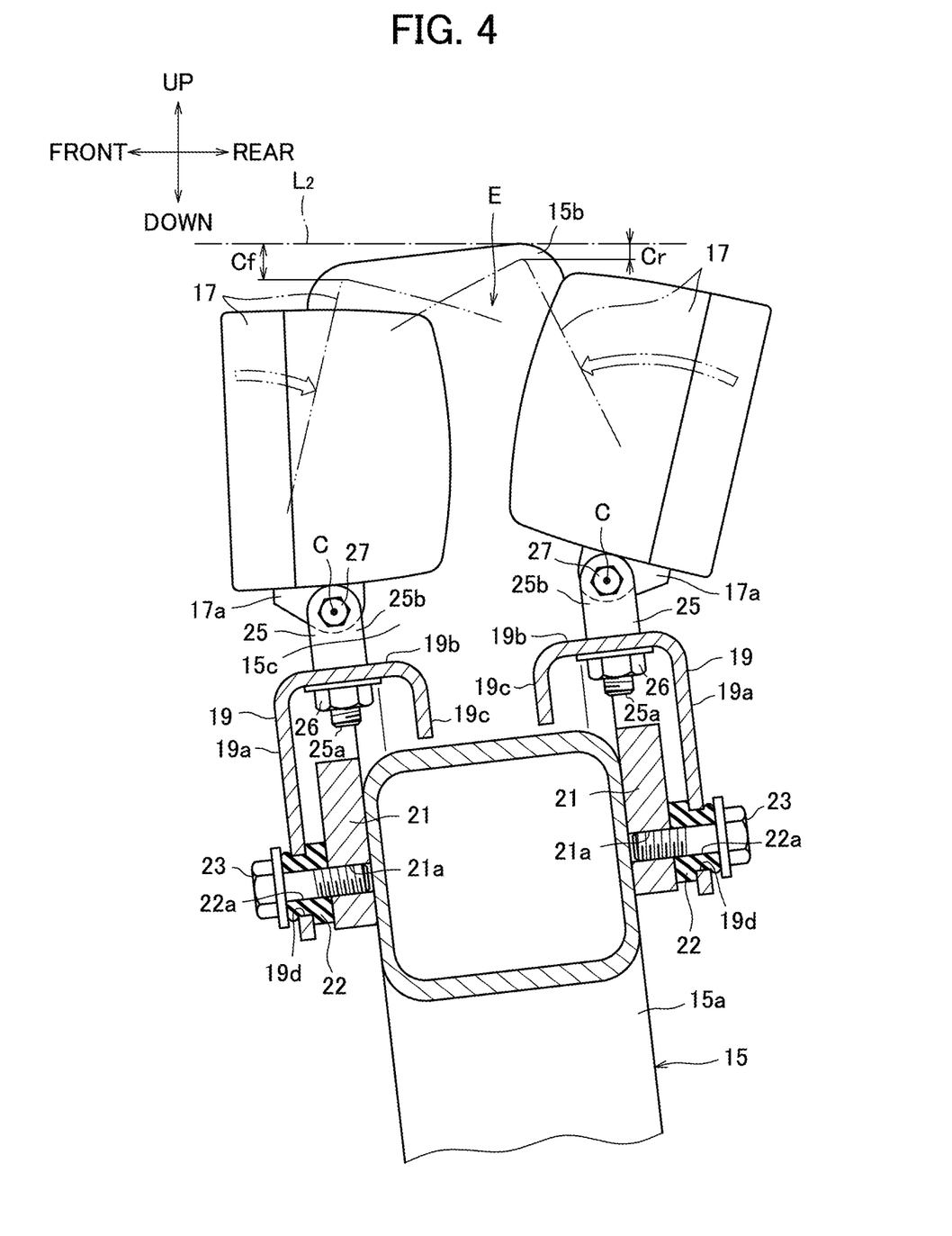
FIG. 4 is a sectional view taken from line IV-IV of FIG. 3 showing the working light and mounting brackets of the working light.

FIG. 3 is a detailed view showing a fixing structure of the working lights 17 and the rotating light 18 in the protect region E of the left shoulder of the ROPS 15. FIG. 4 is a sectional view taken from the line IV-IV of FIG. 3 showing the working lights 17 and the mounting brackets 19 and 20 of the working lights 17. Basically, the working lights 17 and the rotating light 18 are fixed to the curved portion 15*c* of the ROPS 15 via the mounting brackets 19 and 20, respectively.

Since the front and rear working lights 17 are fixed in a front-rear symmetrical arrangement (shown as to be left-right symmetrical in FIG. 4), the front working light 17 will be described as a representative. A pipe material forming the ROPS 15 has a cross-section square, and a fixed base 21 having a pair of female screws 21*a* (one is shown in FIG. 4) is welded on the front surface of the curved portion 15*c*. A vertical surface 19*a* of the mounting bracket 19 formed by bending a steel plate is arranged on the front side of the fixed base 21. An upper end of the vertical surface 19*a* is bent backward to form a horizontal surface 19*b*, and a rear end of the horizontal surface 19*b* is bent downward to form a reinforcing surface 19*c*.

A pair of bush holes 19*d* is formed at a lower portion of the vertical surface 19*a*, and a rubber bush 22 (elastic body) is fit into each bush hole 19*d*. A bolt hole 22*a* is formed in each bush 22 in the front-rear direction, and a bolt is inserted into each bolt hole 22*a* from the front direction and screwed into each female screw 21*a* of the fixed base 21. As a result, the mounting bracket 19 is resiliently supported from the fixed base 21 via the bush 22 without being in direct contact with the fixed base 21.

A tilting base 25 is arranged on the horizontal surface 19*b* of the mounting bracket 19, and a bolt 25*a* protruding downward from the tilting base 25 penetrates the horizontal surface 19*b* and is screwed with a nut 26, whereby the tilting base 25 is fastened in such a way that the angle is changeable in a horizontal direction. A pair of bearing surfaces 25*b* is erected on the left and right ends of the tilting base 25, and a pair of left and right flange portions 17*a* of the working light 17 directed forward is arranged between the two bearing surfaces 25*b*.

A bolt 27 passes through the bearing surface 25*b* and the flange portion 17*a* from the left side and is screwed with the nut 28 on the right side. As a result, the working light 17 is fixed in such way that the angle is adjustable centering on an axis C of the bolt 27, and the forward irradiation direction is adjusted up and down according to the angle.

Further, as is apparent from FIGS. 3 and 4, the members such as the vertical surface 19*a* of the mounting bracket 19 and the fixed base 21 are placed on an inner peripheral side than the lower surface of the curved portion 15*c*, that is, considered not to protrude into the driver's seating space that should be secured in the event of rollover of the vehicle.

The above description is the fixing structure of the working light 17 on the front side for the curved portion 15*c* via the mounting bracket 19. Since the working light 17 and the mounting bracket 19 on the rear side are also fixed to the rear surface of the curved portion 15*c* with the same structure that is front-rear symmetrical, the same numerals are given to the same members and the duplicate description thereof will be omitted.

Meanwhile, although not shown, the mounting bracket 20 for fixing the rotating light 18 has a shape in which the horizontal surfaces 19*b* of the mounting brackets 19 of the front and rear working lights 17 are connected to each other, and is arranged to straddle the curved portion 15*c* of the ROPS from above. In the mounting bracket 20, the fixing structure for the curved portion 15*c* is the same as the mounting bracket 19 of the working light 17, and a pair of front and rear vertical surfaces 20*a* of the mounting bracket 20 is fastened to the front and rear surfaces of the curved portion 15*c* of the ROPS 15 by bolts 23 via bushes (not shown).

Further, a mounting boss 20*c* protruding upward is welded on the horizontal surface 20*b* of the mounting bracket 20 instead of the tilting base 25 of the working light 17, and the rotating light 18 is detachably mounted on the mounting boss 20*c*.

Next, the arrangement of the mounting brackets 19 and 20 and the working light 17 in the protect region E will be described.

First, as shown in FIG. 1, the rotating light 18 is positioned directly above the curved portion 15*c* of the ROPS 15 in the front-rear direction, and the front and rear working lights 17 are also positioned directly above the curved portion 15*c*. The mounting brackets 19 and 20 for fixing the working lights 17 and the rotating light 18 respectively are also positioned in the vicinity of the curved portion 15*c*. Further, since the entire ROPS 15 is slightly inclined forward, the rear working light 17 is also positioned forward of the rearmost portion of the rear vehicle body 5, thereby being prevented from protruding backward.

Further, in the vibration roller 1 of the present embodiment, the left arms 4*a* and 5*a* supporting the front and rear compaction wheels 2 and 3 are positioned on the leftmost side of the front vehicle body 4 and the rear vehicle body 5. Similarly, the right arms 4*a* and 5*a* are positioned on the rightmost side of the front vehicle body 4 and the rear vehicle body 5. Therefore, an outer side surface of the left arms 4*a* and 5*a* corresponds to one maximum width of the vehicle bodies 4 and 5, and the outer side surface of the right arms 4*a* and 5*a* corresponds to the other maximum width of the vehicle bodies 4 and 5. The distance between the outer side surfaces of the left arms 4*a* and 5*a* and the right arms 4*a* and 5*a* corresponds to the maximum width of the vehicle bodies 4 and 5. In FIG. 3, an imaginary line obtained by extending the outer side surfaces of the left arm 4*a* and 5*a* upward is displayed as a lateral restriction line L1.

Further, since a maximum height of the ROPS 15, more specifically, the ROPS 15 is slightly inclined forward, as shown in FIG. 4, a corner portion between the upper surface and the rear surface of the coupling portion 15*b* having a cross-section square corresponds to the maximum height of the ROPS 15, and in FIG. 3, an imaginary line extending the maximum height laterally is displayed as a upper restriction line L2. Therefore, in the present embodiment, an approximately triangular region surrounded by the lateral and upper restriction lines L1 and L2 and the curved portion 15*c* of the ROPS 15 functions as the protect region E.

The description will begin with the conclusion. In front view, the work assist devices other than the rotating light 18 fall within the protect region E during compaction work, and all work assist devices fall within the protect region E by removal of the rotating light 18 during transportation of the vibration roller 1, thereby preventing damage to the work assist devices due to contact with an obstacle.

Although the mounting brackets 19 and 20 are special-purpose products, the working lights 17 and the rotating light 18 are ready-made products, so that downsizing of the working lights 17 and the rotating light 18 is difficult. For this reason, in order to secure the protect region E within which all the work assist devices (in this example, the mounting brackets 19 and 20 and the pair of front and rear working lights 17) can fall, a curvature of the curved portion 15*c* of the ROPS 15 is set according to the sizes and the number of work assist devices. As a result, the curvature of the curved portion 15*c* is often set on the increase as compared to a curved portion of conventional ROPS. Since the increase in curvature acts to gently change a shape of the ROPS 15, in the present embodiment, a secondary effect is obtained that deformation of the ROPS 15 in the event of rollover can be more reliably prevented by strength improvement of the ROPS 15.

Hereinafter, the arrangement of the work assist devices in the protect region E will be described separately in the case of compaction work and in the case of transportation of the vibration roller 1.

Firstly, in performing compaction work, the rotating light 18 is mounted on the mounting boss 20*c* of the mounting bracket 20, and the most part of the rotating light 18 protrudes beyond the upper restriction line L2 from within the protect region E. However, in the compaction work, it is not necessary to observe the upper restriction line L2 assuming height restrictions, and only the lateral restriction line L1 is restricted. Of the work assist devices including the rotating light 18, the front and rear working lights 17 are positioned at the leftmost position, but the left ends of the working lights 17 are positioned to the right side of the lateral restriction line L1, thereby preventing protrusion to the left side. Therefore, even in the case where the vibration roller 1 compacts a road surface along a wall or in the vicinity of a guard in compaction work, contact with an obstacle is avoided in any work assist device, thereby preventing damage due to the contact in advance.

Further, during transportation of the vibration roller 1 by trailer and so on, the rotating light 18 is removed from the mounting boss 20*c* of the mounting bracket 20, and the remaining mounting bracket 20 is positioned below the upper restriction line L2. Among the work assist devices, the front and rear working lights 17 are positioned at the top, and the upper ends of these working lights 17 are also positioned below the upper restriction line L2.

More specifically, as described above, an angle of the working lights 17 can be adjusted centering on the axis C of the bolt 23, and clearances Cf and Cr with the upper restriction line L2 change according to the angle. FIG. 4 shows a state in which the front and rear working lights 17 most approach the upper restriction line L2 and the state is indicated by an imaginary line, and the clearances Cf and Cr are secured for each of the working lights 17. Therefore, regardless of the adjustment angle of the working lights 17 for the adjustment of the irradiation direction, the working lights 17 are always positioned below the upper restriction line L2.

Further, as in the case of compaction work, the left ends of the working lights 17 are positioned to the right side of the lateral restriction line L1. As a result, all work assist devices fall within the protect region E, thereby preventing an outward protrusion.

Therefore, upon transporting the vibration roller 1 by trailer and so on, it is possible to avoid the situation where the work assist devices are damaged in contact with an obstacle. Further, since there is no protrusion of the work assist devices to the upper side, it is sufficient as long as the maximum height of the ROPS 15 when the vibration roller 1 is loaded on the trailer and so on is fulfilled for height restrictions based on the regulations. As a result, it is possible to study a transportation method to accommodate the height restrictions without considering the work assist devices.

Needless to say, with regard to the protect region E formed on the right shoulder of the ROPS 15 as well, only the rotating light 18 is omitted but other configurations, such as a size of the protect region E including a curvature of the curved portion 15*c* or the arrangement of the working lights 17, are the same, whereby the same effects can be obtained.

Meanwhile, in the present embodiment, the working lights 17 and the rotating light 18 are supported elastically by the curved portion 15*c* of the ROPS 15 via the bushes 22 of the mounting brackets 19 and 20. In some cases, the compaction wheels 2 and 3 are vibrated by an exciter in order to make the compaction work more efficient. However, transmission of the vibration to the working lights 17 and the rotating light 18 via the ROPS 15 may cause a problem such as burn-out of a light bulb. In the present embodiment, since the vibration is blocked by the bushes 22, an effect of preventing such a problem in advance can be obtained.

However, a buffer action by the bushes 22 may become unnecessary, for example, when the working lights 17 and the rotating light 18 are switched to LEDs. In a second embodiment, the vibration roller 1 assuming such a case will be described.

Second Embodiment

Figure 5:
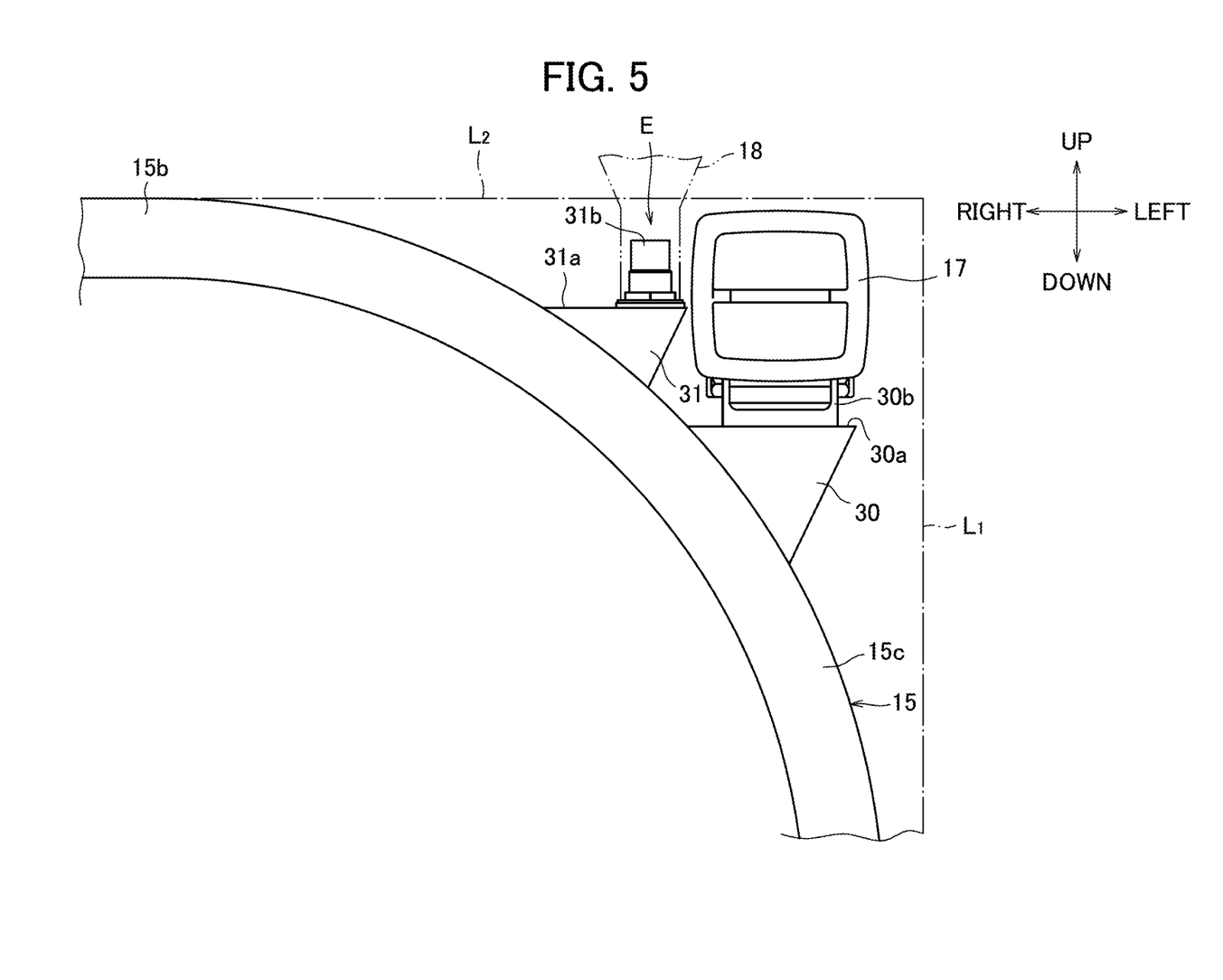
FIG. 5 is a detailed view showing a fixing structure of a working light and a rotating light in a protect region of a left shoulder of ROPS in a second embodiment.

Explained briefly, the vibration roller 1 of the present embodiment is obtained by welding the mounting brackets 30 and 31 of the working lights 17 and the rotating light 18 to the curved portion 15c of the ROPS 15 instead of bolting.

FIG. 5 is a detailed view showing a fixing structure of the working light 17 and the rotating light 18 in the protect region E of the left shoulder of the ROPS 15 in a second embodiment.

In front view, each of the mounting brackets 30 and 31 is formed into an approximately triangular shape, one side of which is welded to the curved portion 15c of the ROPS 15, and the other side is defined as a horizontal surface 30a and 31a. A tilting base 30b that is the same as that of the first embodiment is welded to the horizontal surface 30a of one mounting bracket 30, thereby supporting the working lights 17, and a mounting boss 31b that is the same as that of the first embodiment is welded to a horizontal surface 31a of the other mounting bracket 31, whereby the rotating light 18 is detachably mounted.

Therefore, although not redundantly described, the same various effects as those of the first embodiment can be achieved.

In the meantime, among the compaction machines provided with the ROPS 15, the ROPS 15 is foldable in some machines in consideration of height restrictions upon transportation by trailer and so on. Therefore, the vibration roller 1 provided with such a foldable ROPS 15 will be described as a third embodiment.

Third Embodiment

Figure 6:
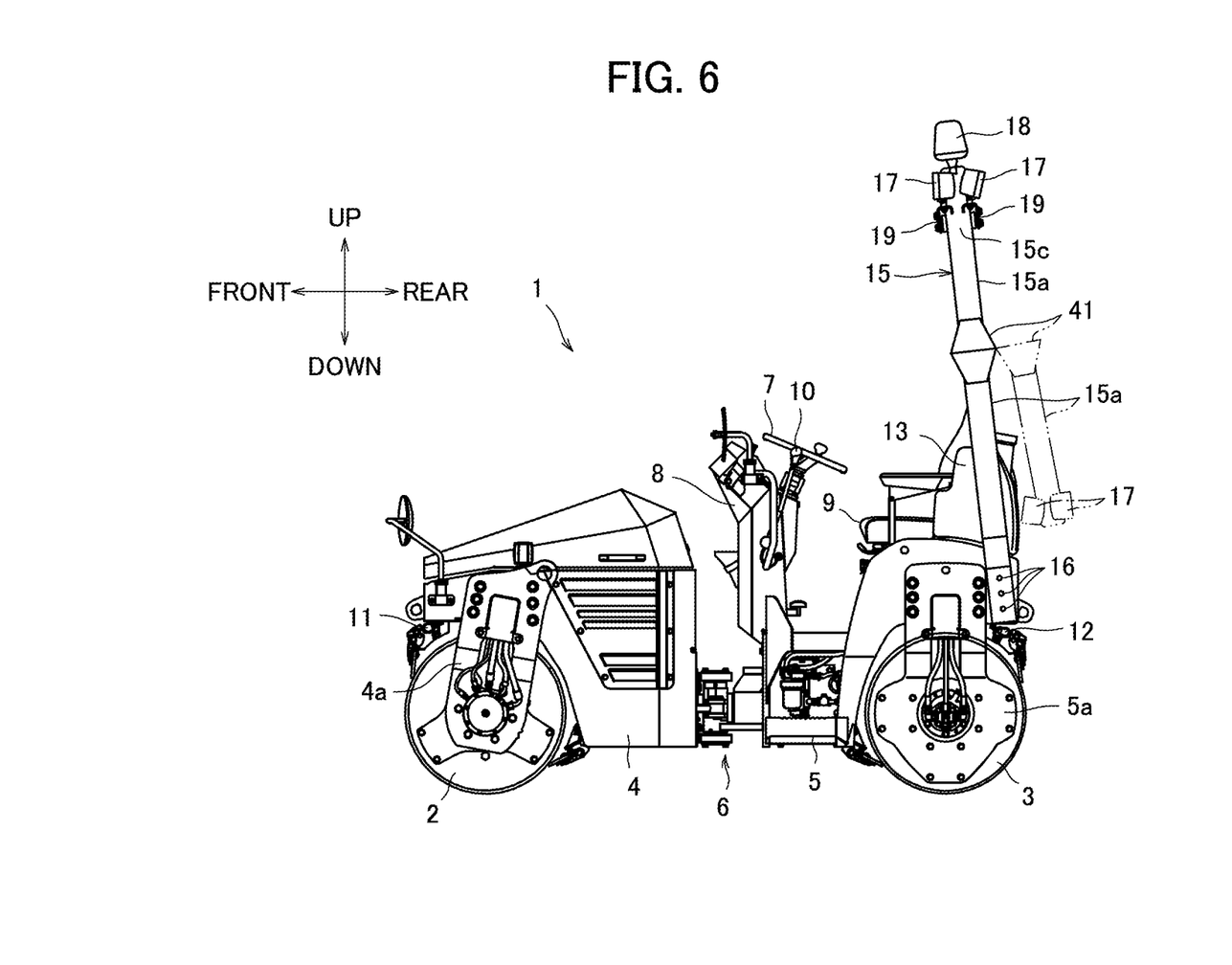
FIG. 6 is a side view showing a vibration roller of a third embodiment.

FIG. 6 is a side view showing the vibration roller 1 of a third embodiment.

The left and right leg portions 15a of the ROPS 15 are foldable about 180° backward centering on a bend rotating portion 41 provided in the middle portion, and an upright position shown by solid lines in the figure is called a developed position and a folded position shown by imaginary lines in the figure is called a storage position. The ROPS 15 is switched to the developed position upon performing compaction work and is switched to the storage position upon transporting the vibration roller 1, and the position of the ROPS 15 is maintained by a lock mechanism (not shown) at any position.

The protect region E formed in the curved portion 15c of the ROPS 15 and the fixing structure of the working lights 17, the rotating light 18 and the mounting brackets 19 and 20 are the same as those in the first embodiment.

However, since the ROPS 15 has a folding function, there is no problem even if the work assist devices protrude upward from within the protect region E during transportation of the vibration roller 1. Therefore, for example, in FIG. 3 described in the first embodiment, the working lights 17 may be arranged so as to protrude above the upper restriction line L2.

At the storage position of the ROPS 15, the working lights 17 and the mounting brackets 19 and 20 most closely approach the rearmost portion of the rear vehicle body 5. In the present embodiment, various conditions such as a locking mechanism for holding a position of the ROPS 15 are set such that the work assist devices in this situation do not interfere with the devices, for example, a rear watering nozzle 12 and a watering tank 13, provided at the rearmost portion of the rear body 5. Therefore, it is possible to prevent damage to the working lights 17 and so on due to interference with the devices in advance.

Although the description of the embodiments will be finished, an aspect of the present invention is not limited to the embodiments. For example, although the vibration roller 1 is applied to the above embodiments, the present invention is not limited to this vibration roller as long as it is a compaction machine provided with the ROPS 15. For example, the present invention may be applied to, for example, a tire roller or a macadam roller.

Further, in the above embodiments, although the work assist devices are each fixed to the right and left shoulders of the ROPS 15, they may be fixed to either one of the shoulders. In the above embodiments, the same protect region E is formed by commonalizing a curvature of the left and right curved portions 15c of the ROPS 15, however, when the sizes and the number of the work assist devices provided on both shoulders are different, a curvature of the curved portion 15c may be changed to form a different protect region E accordingly.

Moreover, in the above embodiments, although the working lights 17 and the rotating light 18 are provided as work assist devices, the present invention is not limited to these embodiments. For example, a camera that captures an image of the rear of the vehicle that is difficult for operators to visually recognize and displays the image on the display of the operation platform 8 may be provided as a work assist device.

EXPLANATION OF REFERENCE SIGNS

1 VIBRATION ROLLER (COMPACTION MACHINE)
4 FRONT VEHICLE BODY
5 REAR VEHICLE BODY
15a LEG PORTION
15b COUPLING PORTION
15c CURVED PORTION
15 ROPS (PROTECTIVE STRUCTURE)
17 WORKING LIGHT (DEVICE MAIN BODY, WORK ASSIST DEVICE)
18 ROTATING LIGHT (DEVICE MAIN BODY, WORK ASSIST DEVICE)
19 MOUNTING BRACKET (WORK ASSIST DEVICE)
20 MOUNTING BRACKET (WORK ASSIST DEVICE)
22 BUSH (ELASTIC BODY)
41 BEND ROTATING PORTION
L1 LATERAL RESTRICTION LINE
L2 UPPER RESTRICTION LINE
E PROTECT REGION

The invention claimed is:

1. A compaction machine comprising:
a protective structure formed into a gate shape obtained by coupling upper ends of a pair of leg portions with a coupling portion and in which an arc-shaped curved portion is formed between each of the leg portions and the coupling portion, the protective structure arranged so as to straddle a vehicle body and in which a lower portion of each of the leg portions is fixed to the vehicle body; and
a work assist device arranged within a protect region formed into an approximately triangular shape surrounded by at least either one of the curved portions, a lateral restriction line in which a side surface corresponding to a maximum width of the vehicle body is extended upward and an upper restriction line in which a maximum height of the protective structure is extended laterally, and fixed to the curved portion of the protective structure in a state that the work assist device is prevented from protruding from within the protect region.

2. The compaction machine according to claim 1, wherein the work assist device is configured to be adjustable in angle and prevented from protruding from within the protect region regardless of an adjustment angle.

3. The compaction machine according to claim 1, wherein the work assist device is a rotating light that notifies nearby persons of work in progress and a mounting bracket for fixing the rotating light to the curved portion of the protective structure, the mounting bracket is positioned below the upper restriction line and prevented from protruding from within the protect region, and the rotating light protrudes upward beyond the upper restriction line from within the protect region, and is detachably mounted on the mounting bracket so as to be removed from the mounting bracket when the compaction machine is transported.

4. The compaction machine according to claim 1, wherein the work assist device is a device main body for performing an intended function, and a mounting bracket for fixing the device main body to the curved portion of the protective structure, and the mounting bracket supports the device main body from the curved portion of the protective structure via an elastic body.

5. The compaction machine according to claim 1, wherein the protective structure is configured to be foldable backward centering on a bend rotating portion provided in a middle portion between the two leg portions, and prevents the work assist device from interfering with a rearmost portion of the vehicle body in a folded state.

6. The compaction machine according to claim 1, wherein the work assist device is prevented from protruding backward from the rearmost portion of the vehicle body.

\* \* \* \* \*